Jan. 26, 1971 R. C. HILLIARD 3,559,201
SECURITY SYSTEM
Filed Jan. 3, 1967

INVENTOR.
ROBERT C. HILLIARD
BY Alfred Stapler
ATTORNEY

United States Patent Office 3,559,201
Patented Jan. 26, 1971

3,559,201
SECURITY SYSTEM
Robert C. Hilliard, Hampton Falls, N.H., assignor to General Atronics Corporation, Wyndmoor, Pa., a corporation of Pennsylvania
Filed Jan. 3, 1967, Ser. No. 612,750
Int. Cl. G08b *13/24*
U.S. Cl. 340—258                                      12 Claims

ABSTRACT OF THE DISCLOSURE

An oscillator driving a coil establishes an electric field between that coil and a second coil generally perpendicular thereto. Disturbances of this field by passage of an electrically conductive object are fed back from the second coil to vary the oscillator phase or frequency, and the resulting variations are utilized to indicate such object passage.

---

The present invention relates to apparatus and methods of detecting the presence of objects and particularly for detecting attempts at clandestine removal of objects by unauthorized persons.

There are many circumstances calling for such detection. For example, in libraries it is important to prevent the removal of books without checking them out, in museums it is important to prevent the theft of exhibits, and in installations affected with the national interest it is important to prevent the unauthorized removal of classified materials. For all such purposes, detection of objects—and particularly of objects in the process of removal from the premises—is helpful.

Techniques for providing the desired detection have been proposed. These involve the application, to the objects which are to be capable of detection, of extraneous material, such as magnetized sheet steel, for example, and the use of a magnetic detector placed in the path which would have to be followed by the object during removal to sense the passage of the object. Alternatively, non-magnetic, but electrically conductive material in special patterns has been applied to the objects to be protected, in order to sense their passage by means of appropriately responsive detectors.

These previously proposed techniques, although experiencing limited success, have also suffered from one or more of a variety of shortcomings. The applied material was too conspicuous, too costly, or too much in need of maintenance. The detector was too unreliable, too insensitive, too subject to accidental activation, too dependent on object orientation, and so forth.

It is accordingly a prime object of the present invention to provide apparatus and methods for performing the desired detection with freedom from one more of the prior art shortcomings.

It is another object to provide the desired detection through inexpensive means.

It is still another object to provide the desired detection through means requiring little maintenance or special processing, once the initial installation has been accomplished.

These and other objects which will appear are provided by an arrangement which involves the application of a sheet of conductive material to each of the objects to be rendered capable of detection, together with the provision of electromagnetic detection apparatus responsive to the proximity of such objects. In particular, the detection apparatus consists of electromagnetic radiating means divided into at least two segments with radiation fields oriented generally perpendicular to each other and disposed relative to the path of the objects so that these are obliged to pass between the segments during unauthorized removal. The reaction of such passage on the electromagnetic radiating means provides the desired detection.

Figure 1:
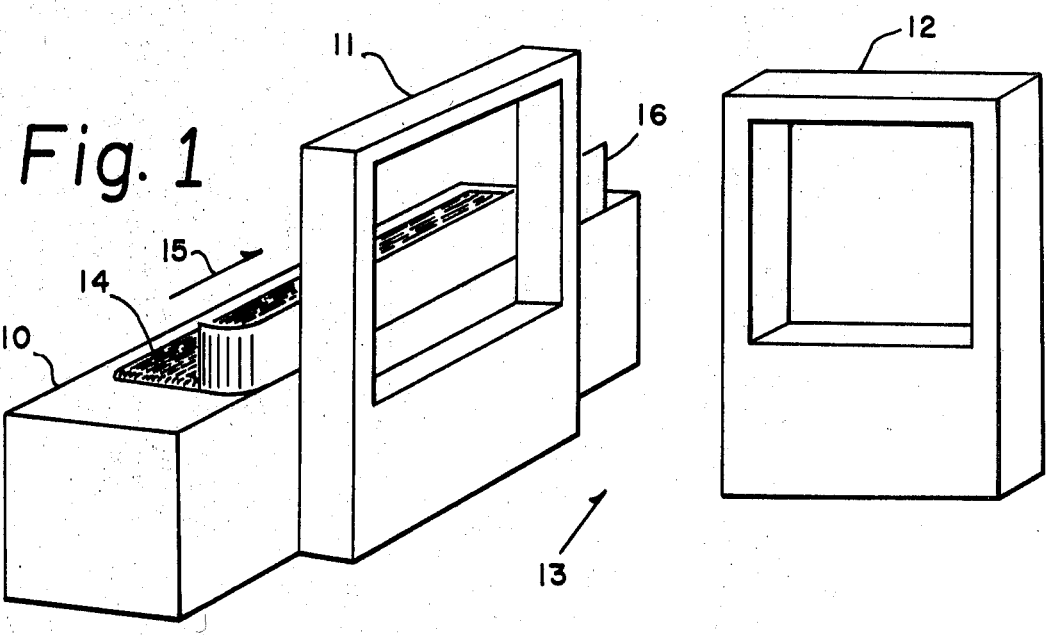
Figure 2:
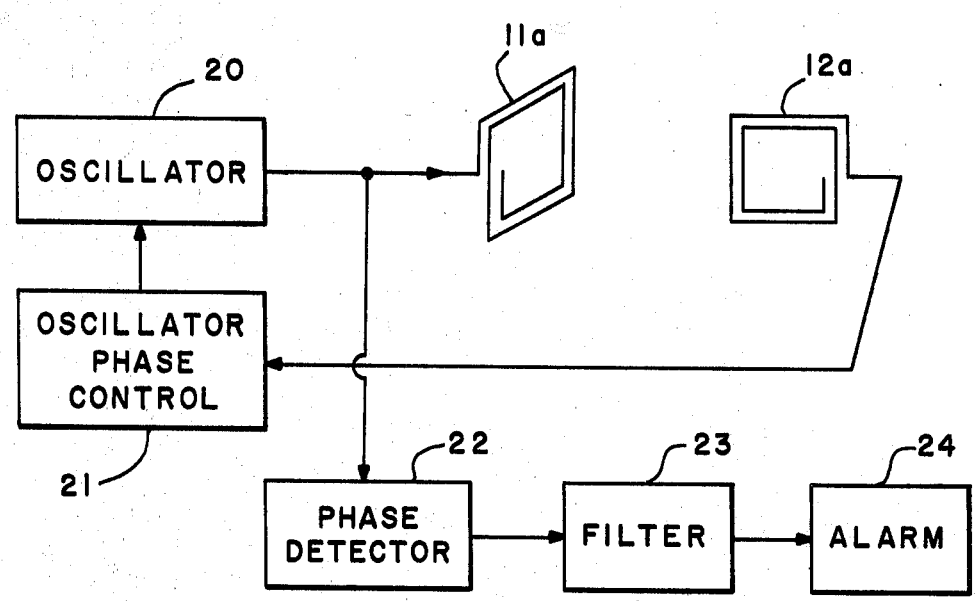

For further details, reference is made to the description which follows and to the accompanying drawings wherein FIG. 1 is an over-all view of an installation of apparatus for realizing the objectives of the invention; and FIG. 2 is a block diagram of the electrical components of the apparatus of FIG. 1.

In FIG. 1, to which reference may now be had, there is shown an installation in a library, the object of the installation being to control the unauthorized removal of books from the library collection. The installation is made in conjunction with a counter 10, corresponding to the check-out counter normally found at the exits of libraries. Two rectangular frames 11 and 12 are positioned adjacent the check-out counter 10. Each frame contains, surrounding its central opening, a coil of conducting wire (which is not visible in FIG. 1 since it is concealed within the frame). One frame, frame 11 in FIG. 1, is placed adjoining counter 10, while frame 12 is separated from frame 11 by a space 13 sufficient to permit passage of one—and preferably only one—person at a time between frames 11 and 12. Conventional means (not shown) such as barriers or walls are utilized to prevent circumvention of the space 13 in exiting from the portion of the library containing the collection.

Frames 11 and 12, and therefore also the coils contained within them, are preferably oriented with their principal planes generally perpendicular to each other. Thus their individual radiation fields, which extend generally at right angles to the planes of the coils, are also oriented generally perpendicularly to each other.

A conveyor belt 14 capable of being energized to transport objects placed thereon in the direction of arrow 15 is preferably provided in the top of counter 10 and a barrier 16 preferably parallels the conveyor 14 and separates it from the frame 11 adjoining counter 10.

The electrical elements of the installation of FIG. 1 are diagrammed in FIG. 2 to which reference may now be had.

These electrical elements comprise an oscillator 20, the output signal from which is supplied to a coil 11a, representing the coil contained within the frame 11 shown in FIG. 1, as previously explained.

Coil 12a, in FIG. 2, represents the coil contained within frame 12 of FIG. 1. Coil 12a is connected to an oscillator phase control circuit 21 whose output is applied to the oscillator so as to control the phase or frequency thereof.

The output signal from oscillator 20, with its phase or frequency controlled as described above, is supplied not only to coil 11a, but also to phase or frequency detector 22, whose output is, in turn, supplied to filter 23 and, via that filter, to an alarm mechanism 24.

In order to produce the desired effect, there is placed in each object to be protected (e.g. in each book of the collection in the illustrative case of a library), a sheet of conductive material, such as aluminum.

This sheet may be quite thin, and even flexible, if desired, and may be concealed in the object as, for example, by pasting it between the hard cover of the book and the paper liner on the inside of the hard cover. Alternatively, the pocket used to hold the library record cards within the book may be made of a paper-and-aluminum laminate and the aluminum introduced into the book in that manner.

When a person desires to remove such a book in the authorized fashion, he takes it to counter 10 (FIG. 1), where a library employee checks it out in the usual way, employing the conveyor 14 to enable the checked-out book to by-pass the space 13 between frames 11 and 12.

On the other hand, when a person attempts the unauthorized removal of a book, he is constrained to carry that book (usually in concealment on his person or in some container) through the space 13 between frames 11 and 12. The passage of the conductive-material-containing book through that space distorts the electromagnetic radiation field which is set up between frames 11 and 12 by virtue of the energization of coils 11a and 12a (FIG. 2) by oscillator 20. This distortion changes the electrical signal developed in coil 12a, which, in turn, alters the control signal applied to oscillator 20 via phase control circuit 21. The resultant change in oscillator phase is detected by phase detector 22. If this change is pronounced, i.e. rapid enough, denoting the passage of a book carrying the particular bulk of conductive material placed therein for detection purposes, then a signal will be developed by phase detector 22 which varies rapidly enough to pass through filter 23, which is preferably a high-pass filter, and this signal—or an amplified and detected version thereof—is used to energize alarm 24.

The specific forms which the various elements of FIG. 2 may take have not been shown in detail since all these elements are, individually, entirely conventional and susceptible of embodiment in any of a wide variety of forms.

Thus the oscillator 20 may be a modified Colpitts oscillator, tuned to operate at a frequency of, say, about 10 kHz. The phase control circuit 21 may consist of a conventional amplifier with phase and gain controls operating on the feedback network of oscillator 20 to change its frequency. The phase or frequency detector 22 may be a phase detector, balanced discriminator, or slope detector. The filter 23 may be a conventional high pass filter capable of transmitting signals above 1 Hz. in frequency while rejecting those below that frequency. The use of the high pass filter minimizes problems due to slow circuit drifts. Filter 23 may also include a low pass filter with a cut-off frequency of about 800 c.p.s. to aid in the rejection of spurious signals. Finally, the alarm 24 may be a bell, light or other indicator, energized from a battery or other power source upon closure of a relay in response to an output signal of sufficient strength from filter 23.

It will be understood that, with the exception of coils 11a and 12a which are contained in frames 11 and 12, all the other elements of FIG. 2 may be housed in the counter 10 of FIG. 1, or, if desired, in some more remote location.

One of the features of the present invention, as represented in FIGS. 1 and 2 described above, is that the conductive material applied to the objects which are to be capable of detection is not required to be of any particular geometrical configuration. This makes it possible to accommodate the invention to a wide variety of specific object-imposed requirements as to the shape of the conductive material. Moreover, and perhaps even more important, it makes it possible to produce this material by inexpensive, mass-production techniques. For example, the material can be laminated to paper which is used for other purposes in books and then processed by standard book manufacturing techniques.

Another feature of the invention is that the detection of the object is not critically dependent on its orientation while passing through the space 13 between frames 11 and 12. This is primarily due to the generally perpendicular relationship which is provided between frames 11 and 12 and the coils contained within them. By virtue of this arrangement, the object will be detected whether carried through the space with its conductive material oriented parallel to frame 11, or parallel to frame 12, or even with intermediate orientations. In the case of books, it is ordinarily impractical to attempt their unauthorized removal in an orientation parallel to the ground. However, if such a threat exists, it can be readily met by the use of an additional coil, similar to coil 12a of FIG. 2, but suspended above or placed below space 13 in a plane generally perpendicular to those of both coils 11a and 12a, i.e. in a plane parallel to the ground. The output from this third coil could then also be used to control oscillator 20 via control circuit 21.

It will be understood that many variations of detail are possible without departing from the inventive concept. For example, if there are large masses of conductive material near the frames 11 and 12, then it may be necessary to adjust the orientation of frames 11 and 12 so as to depart somewhat from exact mutual perpendicularly to maximize the response due to object passage. As another example, the high pass filter 23 may be replaced by a band-pass filter which would have the result that the system becomes sensitive to the speed of passage of objects therethrough. This would be the case because only variations in oscillator signal in a particular range of frequencies—corresponding to a particular range of object passage speeds—would be capable of activating alarm 24. Accordingly, it is desired to limit the invention only by the scope of the appended claims.

I claim:

1. A system for detecting objects provided with electrically conductive material, said system comprising:

at least two electro-magnetic radiating structures, each having a predetermined radiation pattern, the different patterns being oriented substantially perpendicularly to each other, and said structures being spaced from each other to permit the passage of said objects therebetween;

a phase or frequency controllable oscillator for energizing one said structure to cause it to radiate in its said pattern; and means coupled to the other said structure and responsive to its energization by the radiation from said first structure, said last-named means being responsive to changes in said energization due to changes in said radiation to control the phase or frequency of said oscillator.

2. The system of claim 1 characterized in that each said radiating structure comprises a generally planar coil of conducting wire, the respective planes of said coils being oriented generally perpendicularly to each other.

3. The system of claim 1 characterized in that said electrically conductive material is of arbitrary shape.

4. The system of claim 3 further characterized in that said material has sufficient area to cause substantial variation in the phase of frequency of said oscillator.

5. The system of claim 1 further comprising means for detecting variations in the phase or frequency of said oscillator.

6. The system of claim 5 further comprising means responsive to detected variations in said phase or frequency to produce an indication of the attainment of a predetermined level by said variations.

7. The system of claim 6 further characterized in that said variation responsive means comprises a filter rejecting variations below a predetermined frequency.

8. The method of detecting removal of an object provided with electrically conductive material, said method comprising the steps of:

energizing a first detection coil to produce an alternating electrical field between itself and a second detection coil spaced from and oriented generally perpendicularly to the first;

deriving from said second coil a signal subject to variations in response to disturbances of said field due to the transportation of said object through said space; and utilizing said variations to control the phase or frequency of said alternating field.

9. The method of claim 8 further characterized in that said transportation of said object through said space is the result of constraining removal of said object to a path including said space.

10. The method of claim 9 further characterized in that said object is principally of paper.

11. The method of claim 10 characterized in that said object is a book.

12. The method of claim 8 characterized in that said object is an object of value.

References Cited
UNITED STATES PATENTS

| | | | |
|---|---|---|---|
| 2,228,294 | 1/1941 | Wurzbach | 340—258X |
| 2,438,197 | 3/1948 | Wheeler | 331—65 |
| 2,983,852 | 5/1961 | Gray | 340—258X |
| 3,058,059 | 10/1962 | Bockemnehl | 340—258UX |
| 2,477,057 | 7/1949 | Grady | 324—41 |
| 2,580,670 | 1/1952 | Gilbert | 324—41 |
| 3,103,655 | 9/1963 | Jones | 340—258 |
| 3,165,739 | 1/1965 | Long et al. | 340—258UX |
| 3,189,885 | 6/1865 | Shields | 340—258 |

FOREIGN PATENTS

| | | | |
|---|---|---|---|
| 763,681 | | France | 340—258 |

THOMAS B. HABECKER, Primary Examiner

D. L. TRAFTON, Assistant Examiner

U.S. Cl. X.R.

331—65